United States Patent [19]
Boterweg

[11] 3,738,323
[45] June 12, 1973

[54] BATTERY FOR FATTENING BROIL CHICKENS

[75] Inventor: Jelle Boterweg, Kampen, Netherlands

[73] Assignee: Big Dutchman (Nederland) N.V., Wezep, Netherlands

[22] Filed: July 31, 1970

[21] Appl. No.: 60,080

[52] U.S. Cl. ................................. 119/18, 119/17
[51] Int. Cl. ......................................... A01k 31/00
[58] Field of Search ................ 119/18, 17, 19, 21, 119/22

[56] References Cited
UNITED STATES PATENTS

| | | | |
|---|---|---|---|
| 3,396,702 | 8/1968 | Trussell | 119/17 |
| 1,127,712 | 2/1915 | Wrenn | 119/21 |
| 1,927,416 | 9/1933 | Petry | 119/18 X |
| 1,222,901 | 4/1917 | Stevens | 119/21 |
| 1,709,136 | 4/1929 | Lockwood | 119/18 X |

FOREIGN PATENTS OR APPLICATIONS 706,701   5/1966   Italy

*Primary Examiner*—Hugh R. Chamblee
*Attorney*—Price, Heneveld, Huizenga & Cooper

[57] ABSTRACT

Cage batteries for fattening broil chickens comprising a frame having at least one layer of cages, each cage layer being provided with a feed and water supply device and a dung-collecting device together with a dung discharge device. On each cage layer, at least one longitudinal row of stationary cages has a feeding and drinking device which is arranged so that the sides of the feeding and drinking device remote from the central longitudinal plane of the row of stationary cages are accessible for feeding and drinking from adjacent cages which are removable from the frame.

14 Claims, 3 Drawing Figures

PATENTED JUN 12 1973 3,738,323

INVENTOR
JELLE BOTERWEG
BY
Kurl Kelman
AGENT

BATTERY FOR FATTENING BROIL CHICKENS

The invention relates to a cage battery for fattening broil chickens comprising a frame having at least one layer of cages, each cage layer being provided with a feeding and water supplying apparatus and a dung collecting apparatus together with a dung discharging apparatus.

Such a device is generally known.

In this known device all cages are placed stationary in the frame, i.e., they remain present in the frame and are not used to transport the animals (birds) when they are ready for slaughter. Moreover these cages have the disadvantage that they do not meet certain required dimensions which are of very great importance for the living conditions of the animals (birds). It appeared namely that the bottom of such a cage must be perforated in a certain way and that the cages must meet certain dimensions, when fattened broil chickens must be obtained, which remain healthy and which are made against relatively low expenses and in a short period ready for slaughter i.e. that their increase of weight is larger per kg used food and per time-unit. Furthermore the animals (birds) must be brought each time before and after the transport respectively out of and into the fixed cages.

The present invention supplies now a battery of cages for fattening broil chickens (store chickens) in which a part of the cages is removable and can be transported with the store-chickens remaining therein and in which said cages and the stationary cages (being irremovable, remaining in the frame) have standard dimensions supplying the effect mentioned above. Moreover the battery is very simply composed and can be manufactured with minimum-costs. The control is also very practical and appropriate.

The invention will be further elucidated on the basis of the drawings enclosed herewith.

Figure 1:
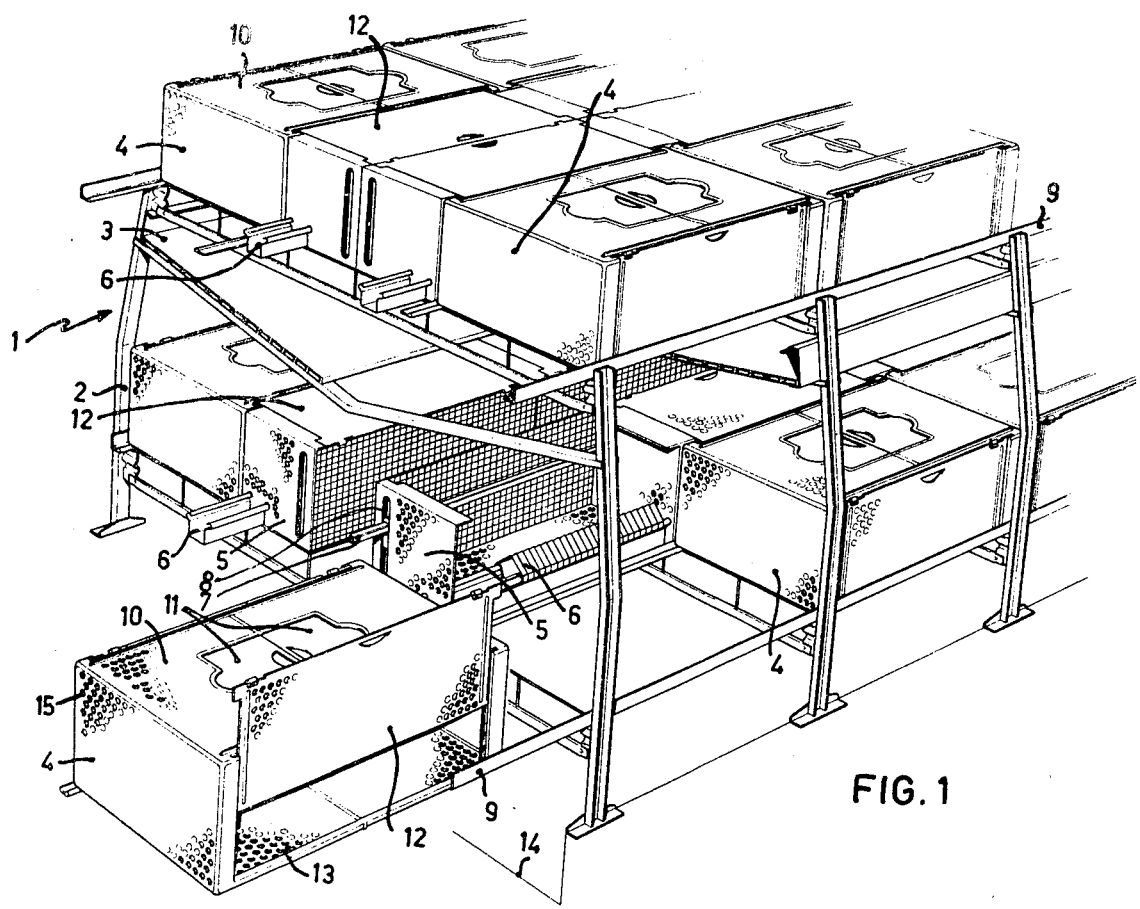
FIG. 1 shows schematically a perspective view of the cage battery according to the present invention.
Figure 2:
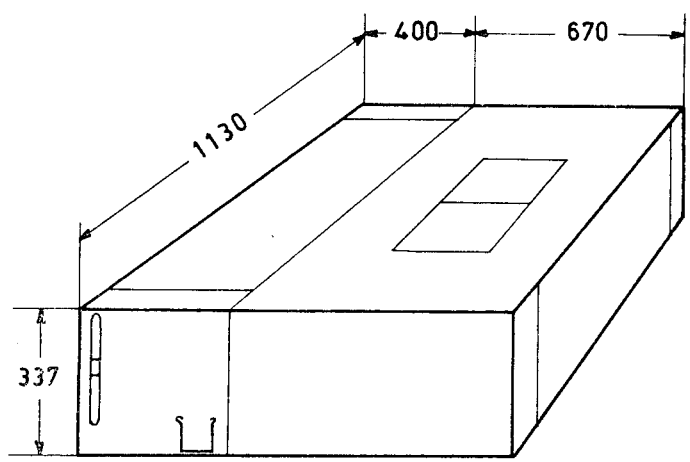
FIG. 2 shows the standard-dimensions of the stationary and the removable cage.
Figure 3:
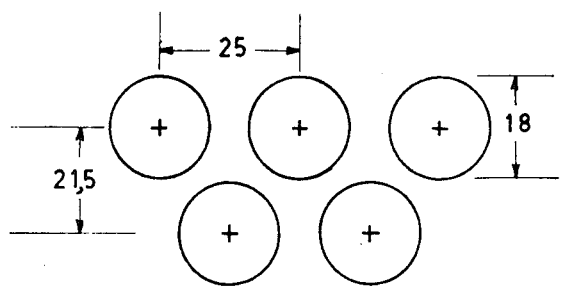
FIG. 3 shows the dimensions of the mutual distances of the perforations in the bottom and possibly also in the side wall of a cage.

The frame 1 of the cage battery having supports 2, being connected by means of horizontal beams, bears one or more floors, on which on each side of the vertical central longitudinal plane of the battery each time two opposite stationary cages 5 having a feeding and drinking device, to wit respectively a feeding trough 6 and a supply-pipe or gutter or troughs 7 being adjustable in height for drinking water with or without drink-nipples, and the sides turned away from the vertical central longitudinal plane are accessible out of the cages 4 being removable from the frame, which cages are adjacent the outside of the stationary cages 5. The top side 10 of a removable cage 4 is provided with a bipartite slidable cover 11, the one of a stationary cage is open and during use is covered by the rotated pulled out slidable wall 12 of the side of a removable cage adjacent to the stationary cage, which slidable wall also being on the opposite longitudinal side of a removable cage, is pivotal around an upper longitudinal border of last mentioned cage after complete pulling out of the removable cage. By means of this slidable wall and the bipartite cover it is possible to remove the animals (birds) respectively sideways and from the top out of the cage.

The dimensions of a stationary cage amount to 1130 × 400 × 337 mm and those of a removable cage 1130 × 670 × 337 mm. All removable cages are manufactured of plastic or similar material, whereas each removable cage meets the required ground-surface per animal (bird) during the transport and the joining (uniting) of the removable and stationary cage meets the most economical way of breeding of the animals (birds) present in the cage in question. The optimum occupation of the cages amounts to 30 animals (birds). The stationary cages are partially made of plastic. The perforations in the endwalls of the stationary cages and the endwalls and longitudinal side walls of the removable cages must meet over circa two-thirds of their total height from the bottom the following dimensions. The aligned perforations have a center-distance of 25 mm, their diameter amounts to 18 mm whereas the center-distance of the above mentioned line with regard to the adjacent line of perforations 21, amounts to 5 mm. Last mentioned perforations have a center line of 18 mm too. These dimensions are substantially for the perforations in the bottom of a cage. Above said height the perforations or similar holes can be larger, as the danger of escape of the animals is no more present.

It namely appeared that the animals (birds) do not get breast-blisters exclusively with these dimensions and spaces of the perforations, which illness makes the birds (animals) totally unsuitably for the slaughterhouses.

Each removable cage 4 is movable over longitudinal beams, as indicated with 9.

It will be clear that for each floor a dung-discharge-device is to be inserted, to wit an inclined discharge-device 3 for top-floor and a dung-trough 14 on or in the ground level.

Finally it is remarked that as further additional advantage of the device according to the present invention can still be mentioned the fact that on a truck for normal rods two cages in longitudinal direction can be placed beside each other (2 × 1130 mm), whereas for trucks for B-roads (B roads are roads exclusively for vehicles having a maximum wheel pressure of 2400 kg and a maximum width of 2.20 m. Larger vehicles are forbidden on B-roads) three cages can be placed beside each other (3 × 670 mm) so that an optimum occupation of the cargo-hold is obtained.

From the foregoing it will be clear that with the device according to the present invention a very appropriate, rational healthy, quick and relatively cheap breeding of chickens is possible, as well as an optimum occupation per unit of stable-surface is obtained.

I claim:

1. A battery of poultry cages comprising in combination: a support frame; a plurality of stationary cages mounted on said support frame, said stationary cages including means for feeding and watering poultry confined therein, each of said stationary cages having a sidewall with means defining an opening therein; removable cages positionable adjacent each of said stationary cages; the dimensions of the adjacent portions of said stationary and removable cages being generally equal to each other; said cages forming a longitudinally extending row of side-by-side cages said removable cages each having means defining an opening through the side which is adjacent said stationary cage; said removable cages having a slidable wall portion forming a gate movable between a first position wherein said removable cage opening is closed and said removable cage is completely enclosed and can be transported about with poultry confined therein, and a second position wherein said removable cage opening is open and is aligned with the opening in a stationary cage when said removable cage is positioned adjacent said stationary cage so that poultry confined within said removable cage have free access between both said 2. The battery of cages according to claim 1 wherein the top side of said stationary cage includes means defining a second stationary cage opening, said slidable wall portion of said removable cage when in said second position being pivotable relative to said stationary cage for movement into a third position wherein it blocks said second stationary cage opening in said stationary cage forming a single combined stationary and removable cage enclosure.

3. The battery of cages according to claim 1 wherein said first and second openings in said stationary cage define the entire side and top side of said cage and the slidable wall portion of said removable cage defines an entire side of said removable cage.

4. A battery of poultry cages having at least one layer of cages comprising: a support frame; stationary cage means mounted on said support frame; said stationary cage means including feeding and watering means permitting poultry located in said cages to eat and drink from said feeding and watering means; removable cage means positionable on said support frame adjacent said stationary cage means; said stationary cage means including spaced partition means; defining openings facing said removable cage means when said latter cage means are positioned adjacent thereto; said removable cage means including a sidewall having a gate movable between a closed position wherein said removable cage means is fully closed for confining poultry therein and an open position wherein poultry are free to move into and out of said removable cage means, said removable cage means being alignable on said support frame adjacent said stationary cage means with said gate in alignment with said opening whereby poultry are free to move between both said cage means when said gate is in said open position.

5. The battery of cages according to claim 4, wherein said watering means is comprised of an open topped water supply conduit adjustable in height relative to said stationary cages for drinking water, and said feeding means is comprised of a feeding trough.

6. The battery of cages according to claim 4, wherein the sides of the removable cages positioned adjacent said stationary cages are provided with a vertically slidable wall forming said gate, said gate in its pulled out position being pivotable with regard to the top sides of said adjacent cages.

7. The battery of cages according to claim 6, wherein the top side of said stationary cages are open and during use of the cage battery the open top side of a stationary cage is covered by one folded, vertically pulled out gate of the removable cage adjacent to the stationary cage.

8. The battery of cages according to claim 6 wherein the top side of said removable cages are is provided with a bipartite slidable cover.

9. The battery of cages according to claim 4 wherein all sides of the cages, with the exception of the longitudinal side walls and the top wall of said stationary cages, are provided with perforations.

10. The battery of cages according to claim 9, wherein the perforations in the cage bottoms and the perforations in the lower two-thirds portion of the endwalls of the stationary cages and the side and end walls of the removable cages have a diameter of 18 mm or less, the center-distance of the aligned perforations amounts to approximately 25 mm and the distance of two adjacent parallel lines of perforations amounts to approximately 21.5 mm.

11. A battery of poultry cages comprising at least one stationary cage and one removable cage positionable adjacent each other; support means for supporting said stationary cage in a stationary manner and for removably supporting said removable cage adjacent said stationary cage; said stationary cage having an open top and sidewall, said open sidewall facing said removable cage when the latter is positioned adjacent thereto; said removable cage having a top, bottom, side and end walls forming a poultry confining enclosure, the wall of said removable cage facing said open side of said stationary cage when said cages are positioned adjacent each other being slidable vertically between a closed position wherein said removable cage is fully enclosed for confining poultry therein and an open position wherein poultry are free to move into and out of said adjacent cages, said slidable wall being pivotal relative the tops of said adjacent cages when in said open position whereby said slidable wall is pivotal over said open top of said stationary cage so that said stationary and removable cages form a fully enclosed cage.

12. The battery of cages according to claim 11 wherein the top side of said movable cages includes slidable cover means to permit insertion and removal of poultry within said cages.

13. The battery of cages according to claim 11 wherein said stationary cage includes feeding and watering means permitting poultry located in said adjacent stationary and removable cages to eat and drink therefrom when said slidable wall is in said open position.

14. The battery of cages according to claim 13 wherein said watering means is adjustable in height relative to said stationary cage.

* * * * *

PO-1050
(5/69)

UNITED STATES PATENT OFFICE
CERTIFICATE OF CORRECTION

Patent No. 3,738,323              Dated June 12, 1973

Inventor(s) Jelle Boterweg

It is certified that error appears in the above-identified patent and that said Letters Patent are hereby corrected as shown below:

Column 3., line 10; after "said" insert -- adjacent stationary and removable cages.

Column 3, line 38; "fully closed" should read -- fully enclosed --

Signed and sealed this 5th day of March 1974.

(SEAL)
Attest:

EDWARD M. FLETCHER, JR.
Attesting Officer

C. MARSHALL DANN
Commissioner of Patents